United States Patent [19]

Tilby

[11] 4,025,278

[45] May 24, 1977

[54] APPARATUS FOR FABRICATING BOARDS FROM SUGARCANE RIND FIBERS

[76] Inventor: Sydney Edward Tilby, 716 E. Ridge Place, Victoria, British Columbia, Canada

[22] Filed: Mar. 5, 1975

[21] Appl. No.: 555,348

[52] U.S. Cl. .............................. 425/404; 100/137; 100/142; 425/324 R; 425/308; 425/384; 425/407

[51] Int. Cl.² ........................ B30B 1/00; B29J 5/00

[58] Field of Search ...... 425/145, 308, 404, 324 R, 425/327, 384, 383, 446, DIG. 200, DIG. 201, 324 R, 407; 100/93 P, 137, 209, 218, 142, 141

[56] References Cited

UNITED STATES PATENTS

| | | | |
|---|---|---|---|
| 2,717,420 | 9/1955 | Roy | 425/308 X |
| 2,855,627 | 10/1958 | Prentiss | 425/308 |
| 3,090,075 | 5/1963 | Provenzano et al. | 425/308 |
| 3,293,692 | 12/1966 | Rosenbaum | 425/308 X |
| 3,554,117 | 1/1971 | Goldkuhle | 100/209 X |
| 3,693,541 | 9/1972 | Lombard et al. | 100/137 |
| 3,908,538 | 9/1975 | Boyd | 100/137 X |

*Primary Examiner*—Robert L. Spicer, Jr.
*Attorney, Agent, or Firm*—Burns, Doane, Swecker & Mathis

[57] ABSTRACT

A board is formed by accumulating a mass of sugarcane rind fibers in a collection zone ahead of a horizontally reciprocable first-stage plunger that has a sweep face. The first-stage plunger is shifted horizontally toward a fiber compression zone to horizontally compact the sugarcane rind fibers and orient the fibers in vertical planes disposed substantially parallel to the sweep face. A second-stage plunger is shifted vertically downwardly from above the compression zone to push the horizontally compacted sugarcane rind fibers downwardly into a generally vertical passage means while vertically compressing the fibers. Consequently, the fibers are oriented in substantially horizontal planes to define a board segment comprised of sugarcane rind fibers having their axes disposed substantially parallel to the longitudinal axis of the board segment. The steps of accumulating, horizontally shifting, and vertically shifting are repeated to establish a column of abutting board segments in the extrusion passage. The board segments are heated at a heating station to melt natural resinous binder substances of the sugarcane rind fibers. Subsequently, the board segments are cooled at a setting station located below said heating station to reharden the natural resinous binder substances and bind together the board segments into a unitary board structure.

8 Claims, 9 Drawing Figures

APPARATUS FOR FABRICATING BOARDS FROM SUGARCANE RIND FIBERS

BACKGROUND AND OBJECTS OF THE INVENTION

This invention relates to the fabrication of board-like products from sugarcane rind fibers.

Recently achieved advancements in the art of sugarcane stalk component separation have rendered highly feasible the individual separation of sugarcane stalk components. These advancements are disclosed, for example, in U.S. Pat. Nos. 3,424,611 (issued Jan. 28, 1969); 3,424,612 (issued Jan. 28, 1969); 3,464,877 (issued Sept. 2, 1969): 3,566,944 (issued Mar. 2, 1971); 3,567,510 (issued Mar. 2, 1971); 3,567,511 (issued Mar. 2, 1971); 3,690,358 (issued Sept. 12, 1972); and 3,698,459 (issued Oct. 17, 1972), all assigned to the assignee of the present invention. By virtue of the methods and apparatus revealed in these patents, the pith, rind, and epidermis portions of sugarcane stalk material may be separately recovered in relatively undamaged condition, thereby maximizing the commercial utility of sugarcane.

Prior to the above-noted advancements, the recovery of sugarcane products involved subjecting the sugarcane stalks to a series of crushing steps that produced a pulverized cane substance termed bagasse. Begasse requires intense processing for the recovery therefrom of juices and other valuable components. The ultimate value of the sugarcane components in the bagasse is restricted due to the destructive effects of the stalk-crushing operations.

Individual separation of sugarcane components made possible by the teachings of the above-noted patents has rendered cane pulverization obsolete. Now the cane components can be recovered in their relatively undamaged natural state suitable for independent processing.

For example, it is now more economically feasible to recover sugar from the individually separated sugar-laden pith component. Subsequent to such sugar removal, the pith fibers, which remain intact, may be processed for the recovery of cellulose. Other parts of the pith may be used in pulp and paper manufacturing operations.

The individually recoverable cane epidermis may be conveniently processed for the recovery of wax products.

The present invention relates to the individually recoverable rind portion of sugarcane stalk material. Sugarcane rind contains numerous fiber bundles, sometimes called fibrovascular bundles, which are groups of elemental fibers in discrete elongated units. The fibers contain natural resinous binder substances which hold the fibers and bundles together. It has been found that undamaged rind strips, recovered through the teachings of the aforelisted patents, can be shredded longitudinally in a manner which loosens or breaks the natural bond between the individual, strand-like rind fibers of the rind strips. In this fashion the individual sugarcane rind fibers can be recovered substantially in their natural state.

It has been discovered that these sugarcane rind fibers have a high longitudinal tensile strength, making them particularly suited for the fabrication of board products. In order to effectively fabricate a board from sugarcane rind fibers, it is necessary to provide fibers which are in a manageable state, properly orient the fibers, and then bond the fibers together. Such steps involve feeding, orienting, and bonding large quantities of randomly arranged, intertwined rind fibers, thus presenting numerous difficulties in being carried out effectively, rapidly and efficiently.

It is an object of the present invention to minimize or obviate such difficulties.

It is another object of the invention to provide board-forming methods and apparatus for rapidly, effectively, and efficiently fabricating boards from sugarcane rind fibers.

It is an additional object of the invention to provide such board products which compare favorably with conventional wooden boards in strength and appearance.

It is a further object of the invention to provide such board products which comprise unitarily bonded sugarcane rind fibers oriented substantially parallel to the longitudinal axis of the board.

BRIEF SUMMARY OF A PREFERRED EMBODIMENT OF THE INVENTION

In accomplishing at least some of these objects a mass of randomly oriented sugarcane rind fibers is accumulated at a collection zone. A horizontally reciprocal first-stage plunger has a sweep face disposed behind the collection zone. A fiber compression zone is located adjacent the collection zone. Power means is provided for horizontally shifting the first-stage plunger toward the compression zone to horizontally compact the mass of sugarcane rind fibers in a manner tending to reorient the fibers so that vertical planes containing the fibers are disposed substantially parallel to the sweep face. A vertical extruder passage is disposed below the compression zone. A vertically reciprocal second-stage plunger is arranged above the compression zone. Power means is provided for vertically shifting the second-stage plunger to push the horizontally compacted sugarcane rind fiber mass downwardly into the extruder passage. In so doing, the second-stage plunger vertically compacts the sugarcane rind fibers in a manner tending to reorient the fibers in substantially horizontal planes. In this fashion, the compacted mass of fibers defines a board segment comprised of sugarcane rind fibers having their axes disposed substantially parallel to the longitudinal axis of the board segment.

The extruder passage is arranged to receive a column of abutting board segments. A melting station is provided comprising heating means for heating the board segments and melting natural resinous binder substances of the fibers. Also provided is a bonding station having means for cooling the board segments and re-hardening the natural resinous binder substances to bind together the board segments into a unitary board structure.

THE DRAWINGS

Other objects and advantages of the present invention will become apparent from the subsequent detailed description thereof in connection with the accompanying drawings in which like numerals designate like elements, and in which.

DETAILED DESCRIPTION OF THE PREFERRED EMBODIMENT

Figure 1:
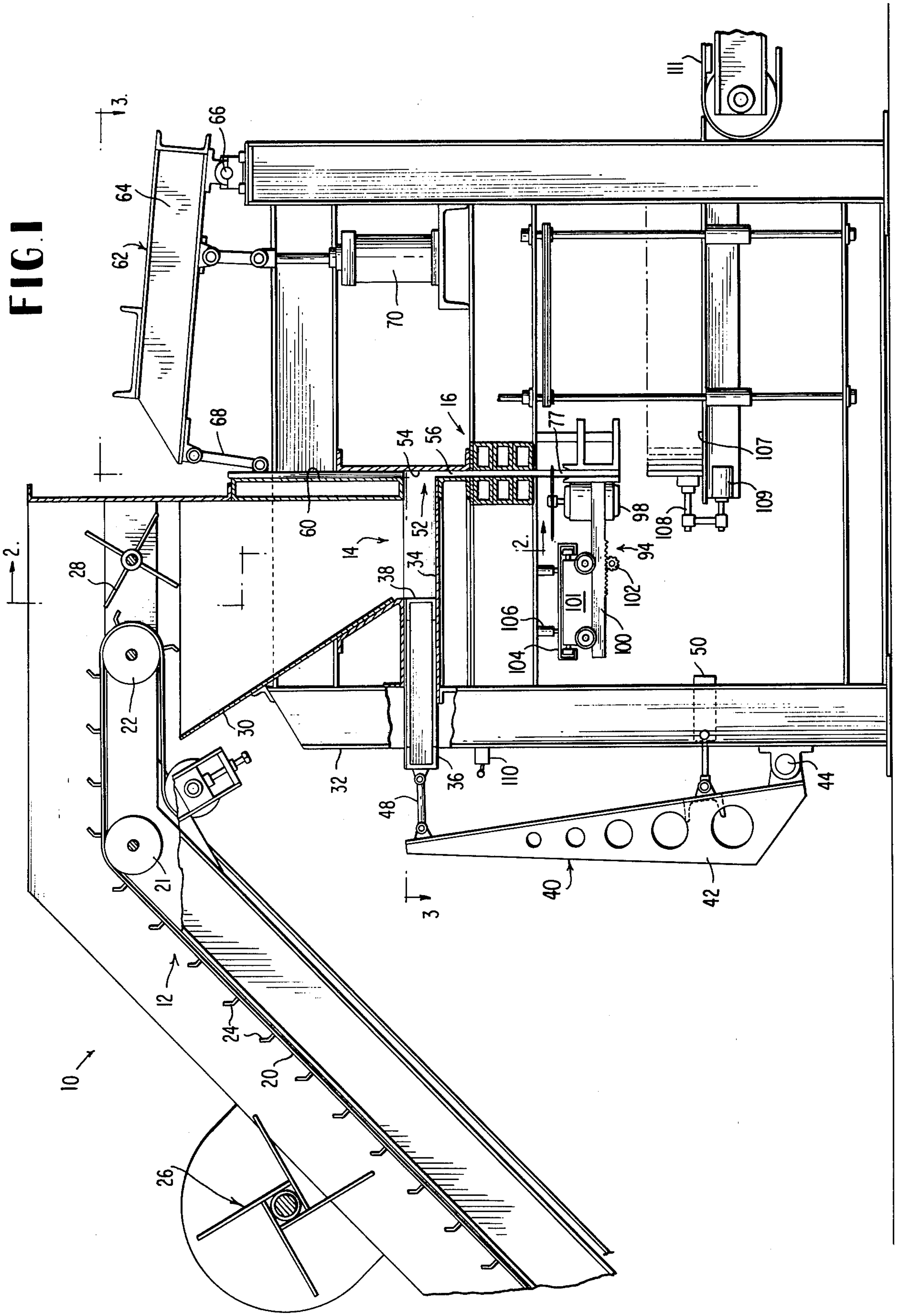
FIG. 1 is a side elevational view, partly in vertical section, of a board-forming apparatus in accordance with the present invention.
Figure 2:
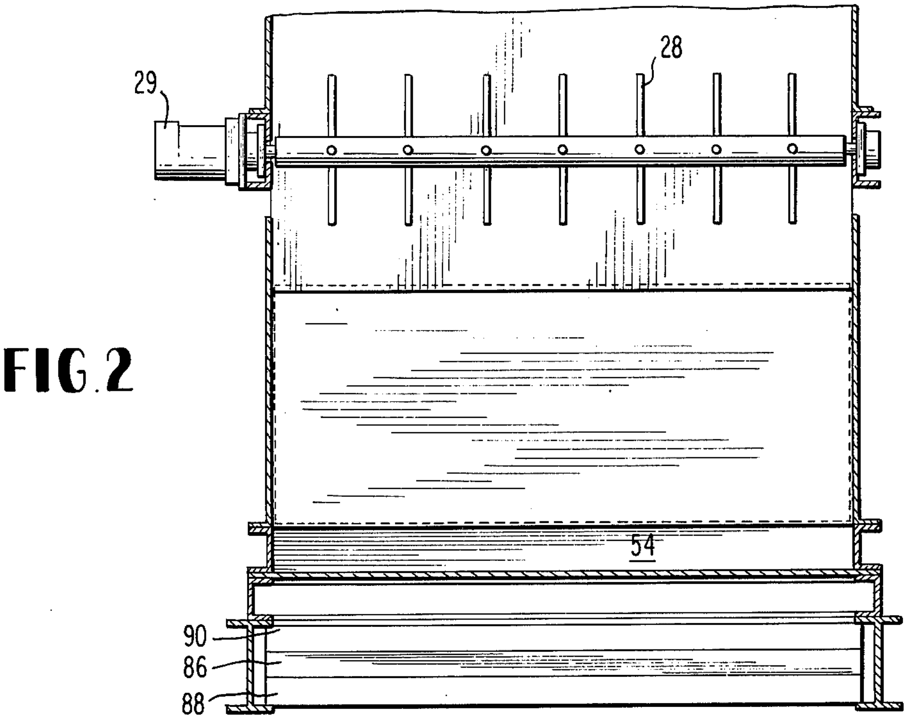
FIG. 2 is a cross-sectional view of the apparatus taken along line 2—2 of FIG. 1.
Figure 3:
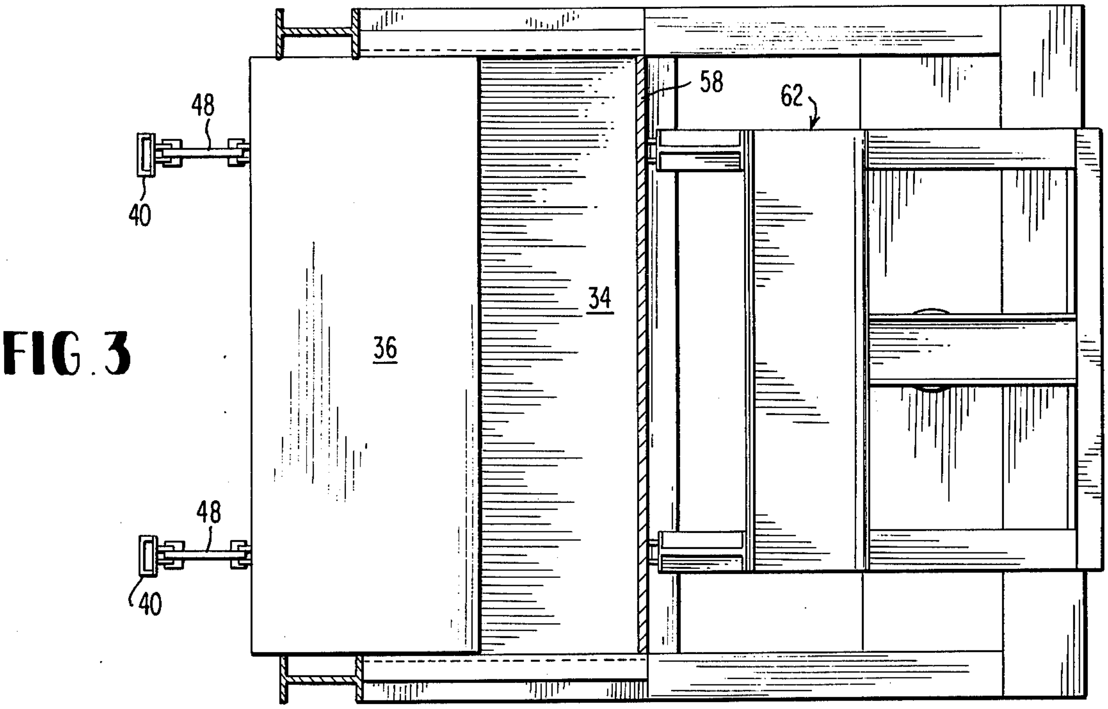
FIG. 3 is a longitudinal sectional view of the apparatus, taken along line 3—3 of FIG. 1.

A preferred board-forming apparatus 10 according to the present invention is depicted in FIG. 1 and includes a sugarcane rind fiber delivery section 12, sugarcane rind fiber extrusion section 14, and a fiber bonding section 16. Sugarcane rind fibers are delivered by the delivery section 12, oriented and compressed in the extruder section 14, and bonded together in the bonding section 16.

The delivery section 12 includes an endless feed conveyor 20 supported by rollers 21, 22. A hydraulic motor 23 is connected to the roller 22 to drive the conveyor 20. The conveyor 20 includes spaced prongs 24 arranged to carry sugarcane rind fibers upwardly as the conveyor is driven in clockwise fashion when viewed in FIG. 1. The sugarcane rind fibers may be delivered to the conveyor 20 in any desired fashion. A tined drum 26 is mounted for rotation intermediate the ends of the conveyor 20 to level the mass of sugarcane rind fibers being conveyed. A flicker wheel 28 is disposed opposite the discharge end of the conveyor 20 and is power rotated by a motor 29 to deflect rind fibers downwardly from the prongs 24.

The sugarcane rind fiber extrusion section 14 is located beneath the discharge end of the conveyor 20 and includes a hopper 30 which is mounted on a superstructure 32. The hopper 30 is arranged to receive sugarcane rind fibers from the conveyor 20 and guide the fibers onto a fiber receiving table 34 located at the base of the hopper 30, the table 34 defining a rind collection zone.

Arranged for horizontal reciprocal sliding movement above the table 34 is a first-stage plunger 36. The first-stage plunger 36 includes a sweep face 38. A power linkage 40 is provided for reciprocating the first-stage plunger 36. The power linkage 40 includes a rocker arm 42 which is pivotally mounted at 44 to the superstructure 32. A connector link 48 pivotally interconnects the rocker arm 42 and the first-stage plunger 36. A hydraulic power cylinder 50 is operably connected between the superstructure 32 and the rocker arm 42 such that extension and retraction of the power cylinder 50 produces horizontal reciprocal strokes of the first-stage plunger 36.

The first-stage plunger 36 travels toward and away from a compression zone 52 of the extrusion section 16. A stationary compaction wall 54 at the compression zone is oriented in facing relation to the sweep face 38. Disposed immediately below the compression zone 52 is an extruder passage 56 which is dimensioned in accordance with the desired final board thickness. The stationary wall 54 defines part of the compression zone 52 and forms a side of the extruder passage 56.

Arranged for vertical reciprocation above the extruder passage 56 is a second-stage plunger 58. The plunger 58 is slidably confined between the upper end of the wall 54 and a spaced wall 60. This second-stage plunger 58 is driven by a second-stage power linkage 62 which is operable to drive the extruder blade downwardly through the compression zone 52.

The second-stage power linkage 62 includes a main arm 64 which is pivotally mounted to the superstructure 32 at 66, and an intermediate link 68 which pivotally connects the outer end of the main arm 64 to the second-stage plunger 58. A hydraulic power cylinder 70 interconnects the superstructure and the main arm and is operable, upon extension and retraction thereof, to vertically reciprocate the second-stage plunger 58.

In operation, the conveyor 20 delivers a charge of sugarcane rind fibers 72 which free-fall downwardly onto the support table 34. These cane rind fibers are disposed in generally random orientation ahead of the sweep face 38 of the first stage plunger 36. Retraction of the first-stage power cylinder 50 causes the first-stage plunger 36 to be advanced toward the compression zone 52. In so doing, the sweep face 38 sweeps the mass of cane rind fibers toward the compaction wall 54 (see FIG. 6A). At the end of the forward stroke of the first-stage plunger 36 the cane rind fibers 72 are compressed horizontally between the sweep face 38 and the compaction wall 54 in a first stage of compaction.

Figure 4:
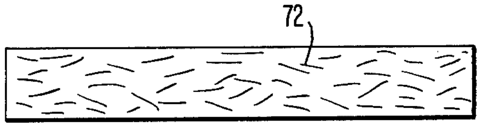
FIG. 4 is a front view of a mass of sugarcane rind fibers which have been horizontally compacted by a first-stage plunger.

FIG. 4 depicts this compressed fiber mass 72 as viewed in a direction from the sweep face 38. The effects of being swept toward the compaction wall 54 and being compressed between such wall and the sweep face 38 causes the individual surgarcane rind fibers to become horizontally shifted toward an orientation that is generally parallel to the sweep face. In other words, the vertical plane defined by each rind fiber tends, during sweeping and compression, to become reoriented towards a parallel posture relative to the vertical plane of the sweep face 38. It will be understood that the fibers themselves are not necessarily oriented horizontally at this point, but may be angled relative to the horizontal within their respective vertical planes.

Figure 5:
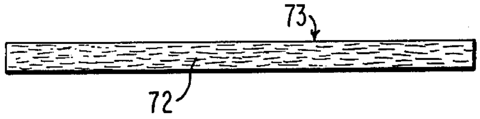
FIG. 5 is a plane view of the mass of sugarcane rind fibers of FIG. 4 after having been vertically compressed by a second-stage plunger.
Figure 6A:
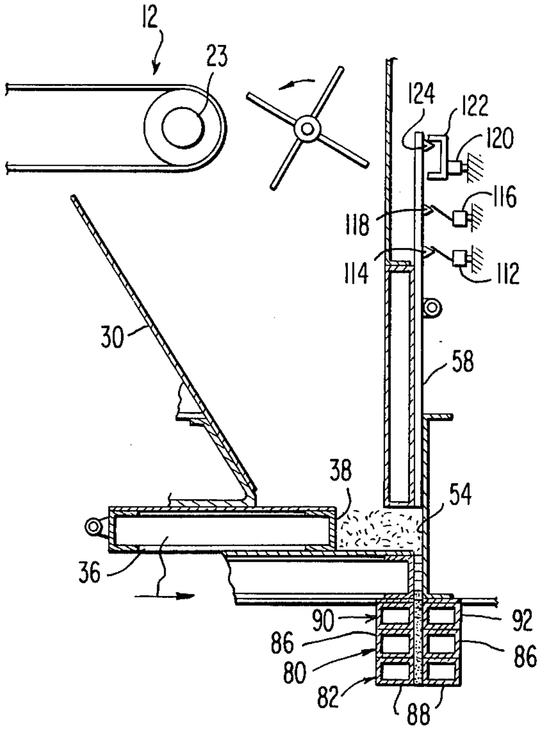
FIGS. 6A through 6D are fragmentary illustrations of the apparatus depicting various phases of a board-forming operation.
Figure 6B:
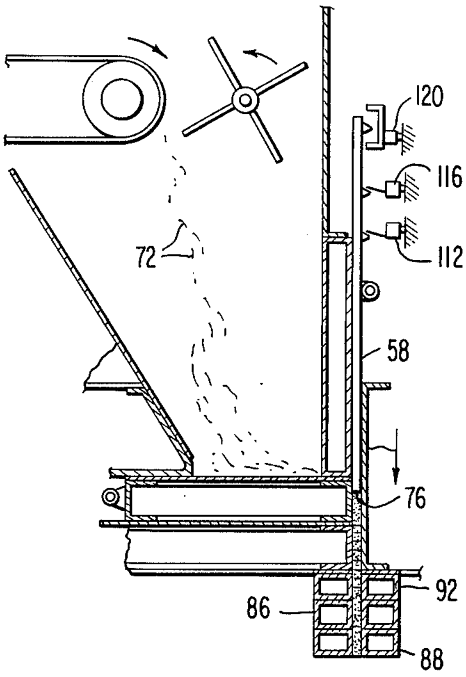

Immediately following the first-stage compression, the second-stage plunger 58 is displaced downwardly by the power cylinder 70 (FIG. 6B). A compression face 76 of the second-stage plunger engages the sugarcane rind fibers and compresses them vertically while pushing them into the extrusion passage 56 atop a previously compressed sugarcane rind fiber charge 74. The forces imparted to the fibers during the second-stage compression tends to shift the fibers vertically toward a horizontal posture. This condition is shown in FIG. 5 which is a top view of the fibers after having been vertically compressed into a board segment 73 by the second-stage plunger 58. The individual fibers of the board segment assume a generally horizontal orientation, with the fiber axes being generally aligned with or parallel to the longitudinal axis of the board segment.

Preferably, the compression face 76 of the second-stage plunger 58 is slightly V-shaped or convexly rounded so that an indentation is formed in the top surface of each board segment to facilitate the internesting of adjacent abutting board segments.

The subsequent formation of additional board segments which are driven into the extruder passage 56 will form a column of board segments that are abuttingly disposed in the extruder passage. This column travels downwardly through the extruder passage 56 in step-by-step fashion as new board segments are added to the column. The sugarcane rind fibers of these board segments, while being tightly intercompacted, are not bonded together by the ligno-cellulosic bonds characteristic of sugarcane rind in its natural state, such bond having been broken during shredding of the rind strips.

In order to reestablish this bonded relationship, the board segments are passed through the bonding section 16. The bonding section 16 includes a melting station 80 and a setting station 82. The melting station comprises a pair of heating units 86 located on opposite sides of the extruder passage 56. Each heating unit 86 contains a plurality of electrical resistant heater wires capable of heating the board segments 74 sufficiently to melt the natural resinous bonding component of the sugarcane rind fibers to a flowable condition. A distinctive feature of sugarcane rind is the fact that subsequent to separation from the remaining sugarcane stalk components and after being longitudinally shredded, there still remains within the sugarcane rind fibers natural bonding resin. Once melted, this resin flows within the board segments and envelops the fibers thereof.

The setting station 82 is disposed immediately below the melting station 80 and comprises a pair of fluid manifolds 88 located at opposite sides of the extruder passage 56. Cooling water is circulated through these manifolds 88 to cool and thereby reharden the liquified resinous material of the board segments. By rehardening the resinous bonding material, the strong ligno-cellulosic bonding between the rind fibers is reestablished. Thus, the fibers of each board segment are firmly bonded to one another and the adjacent board segments are firmly bonded together to define a unitary board product 77.

While in many cases the natural bonding resins remaining in the rind fibers may be sufficient to produce a unitary bonding of the board segments, it may in some cases be desirable to augment this natural bonding resin. For example, additional resin may be dusted onto the rind fibers as they travel upon the conveyor 20. Alternatively, the extra resin may be applied in liquid form to the fibers which are dried before being fed to the board-forming apparatus. Resins which have proved successful for this purpose are, for example, molding resins made by the American Cyanamid Company designated as Melurac Nos. 304 and 305, and a resin made by the Union Carbide Company designated as BRP 4425. These supplementary resins are further useful in that they provide waterproofing properties to the finished board product.

Disposed immediately ahead of the melting station 80 there is preferably located a pre-cooling station 90. The pre-cooling station 90 comprises fluid manifolds 92 arranged at opposite sides of the extruder passage 56. Water from the setting station 82 is circulated through the manifolds 92 to maintain the rind fibers at temperatures below the melting temperature of the bonding resins as the fibers approach the melting station 80. In this manner, premature melting or setting of the resins in the compression zone or the extrusion passage 56 is resisted.

Situated below the setting station 82 is a cutting mechanism 94. This cutting mechanism includes a rotary cutting blade 96 which is driven by a motor 98. The motor is mounted on a toothed rack 100, the latter being mounted on a housing 101 for translation toward and away from the board 77 by means of a powered pinion gear 102. The housing 101 is mounted on a track 104 for movement parallel to the board axis under the urging of any suitable power mechanism, such as hydraulic cylinders (not shown). The track 104 is vertically adjustable by pneumatic cylinders 106 to vary the vertical positioning of the rotary cutting blade 96. As sections of the finished board are discharged from the lower end of the extruder passage 56, the saw blade is operable to sever strips of a predetermined length. The severed strips fall onto a platform 107 where they are maintained in free-standing vertical position by a pusher bar 108, the latter being operated by a hydraulic cylinder 109 to incrementally shift the free-standing board strip toward a discharge conveyor 111.

In order to automatically operate the conveyor 20 and the first and second-stage plungers 36 and 58 in proper sequence, an automatic control system is utilized. As will be explained subsequently, the control system includes a plurality of switching valves located so as to be actuated by moving elements of the equipment. The switching valves are conventional and comprise hydraulic valves which, when shifted, supply fluid to different ends of their associated hydraulic motors. Suitable valves are available from Racine Hydraulics of Racine, Wisconsin.

A first switching valve 110 is mounted on the superstructure adjacent the rocker arm 42 and is engaged thereby when the first-stage plunger 36 reaches the forward end of its stroke. When so engaged, the switching valve 110 terminates the flow of hydraulic pressure to the power cylinder 50. Consequently, the first-stage plunger 36 is stopped and held in its forward stroke position. The switching valve 110 is self-biased so as to return to its non-activated position when it is disengaged from the rocker arm 42 by means to be subsequently described.

A second switching valve 112 is mounted on the superstructure and is operably connected to control the flow of hydraulic fluid to the conveyor drive motor 23. The conveyor control switching valve 112 is biased downwardly and is shiftable upwardly by a flange 114 of the second-stage plunger 58 as the latter reciprocates. Shifting of the switching valve 112 during downward movement of the second-stage plunger initiates operation of the conveyor 20, and shifting thereof during upward movement of the plunger 58 stops operation of the conveyor.

The control system can be provided with an interlock between the first and second switching valves 110, 112 to assure that the activation of the second switching valve 112 will not operate the conveyor 20 unless the first switching valve 110 has been activated to hold the first-stage plunger in an extended position at the end of its compression stroke.

A third switching valve 116 is disposed on the superstructure adjacent the path of movement of the second-stage plunger 58. This third switching valve controls the flow of hydraulic fluid to the power cylinder 50 and thereby controls extension and retraction of the first-stage plunger 36. The valve 116 is biased downwardly. The plunger 58 has a finger 118 which, during an upward stroke of the plunger 58, shifts the valve 116 upwardly to initiate a compression stroke of the plunger 36. During downward movement of the second-stage plunger 58, the valve 116 shifts downwardly to initiate a compression stroke of the first-stage plunger 36. The degree of compaction of the fibers by the plunger 36 is controlled by the first valve 110 as previously discussed. The valve 116 and the finger 118 are spaced below and to the side of the valve 112 and flange 114 so that the flange 114 makes no contact with the valve 116 and finger 118 makes no contact with switch 112.

A fourth switching valve 120 is mounted on the superstructure to control reciprocation of the second-stage plunger 58. This valve 120 includes a slide 122 which is engageable by a pin 124 mounted on the second-stage plunger 58. When the plunger 58 is retracted upwardly, the pin 124 engages an upper lip of the slide 122 and moves the slide upwardly to reverse movement of the second-stage plunger, i.e. shift it downwardly. At the bottom of the extrusion stroke of the second-stage plunger, the pin 124 engages and shifts a lower lip of the slide 122 to reverse movement of the second-stage plunger by withdrawing it upwardly.

Although the employment of strategically located limit switches is preferred, automatic operation of the various machine elements could be accomplished in other ways. For example, a rotary control shaft could be provided with a series of cams oriented to sequentially operate the various limit switches as the shaft rotates.

OPERATION

The operation of the present invention will be discussed at the point at which the first-stage plunger 36 begins its advancement toward the compression zone 52. A charge of sugarcane rind fibers 72 disposed on the support table 34 will be swept by the sweep face 38 toward the compression zone 52 (FIG. 6A). At the compression zone 52, the fibers will be horizontally compacted together as the fibers are pressed against the compaction wall 54 (FIG. 6B). During compression, the fibers will be caused to be oriented such that vertical planes containing the fibers will be arranged generally parallel to the sweep face 38. When the first-stage plunger 36 reaches the forward extent of its compression stroke, the first switching valve 110 will be engaged by the rocker arm 42 to terminate movement of this plunger 36.

Figure 6C:
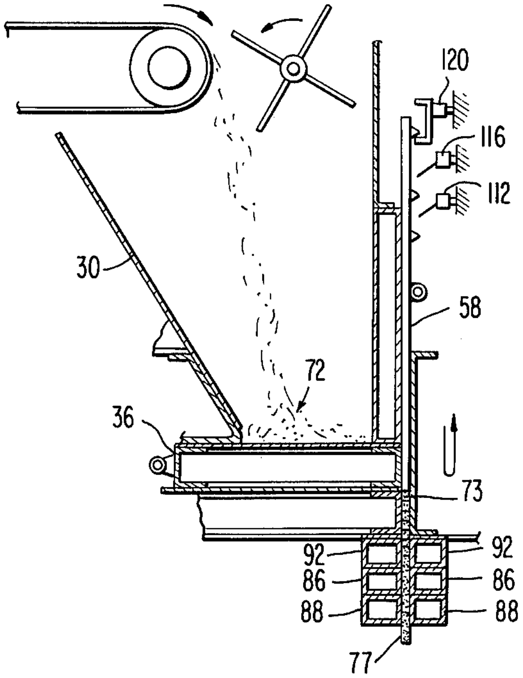

At this point, the second-stage plunger 58 will have completed its previous upward retraction stroke. The pin 124 shifts the slide 122 upwardly to cause the reversal of the movement of the cylinder 70 into a downward plunging stroke against the horizontally compressed charge of rind fibers to press the charge into the extruder passage 56. In so doing, the plunger 58 compresses the charge vertically in a manner causing further reorienting of the fibers (FIG. 6C). That is, the fibers are urged toward a horizontal posture so as to be arranged generally parallel to one another and parallel to the compression faces of the first and second-stage plungers 36, 58 (FIGS. 4 and 5).

At this point, the fibers will have been fashioned into a highly compacted board segment 73 of sugarcane rind fibers oriented substantially parallel to the longitudinal axis of the board segment.

During the downward compression stroke of the second-stage plunger, the third valve 116 shifts downwardly to operate the conveyor 20. A new charge of sugarcane rind fibers is thus dropped downwardly by the conveyor 20 onto the top of the first - stage plunger 36 (FIG. 6B).

Figure 6D:
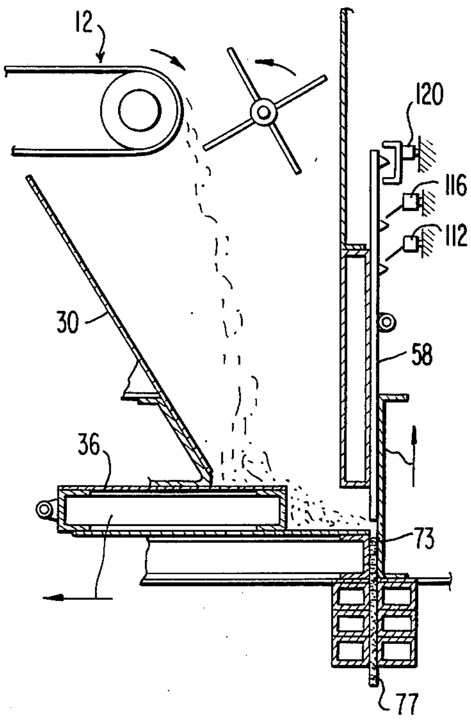

Also during downward movement of the plunger 58, the valve 112 shifts downwardly to retract the plunger 36. Any newly fed fibers which have fallen onto the plunger 36 will be scraped therefrom onto the table 34 as the plunger 36 passes beneath the hopper 30 (FIG. 6D).

At the lower extent of the extrusion stroke of the second-stage plunger 58, the pin 124 engages and shifts the lower lip of the slide 122. As a result, the cylinder 70 is reversed and the second stage plunger 58 is retracted upwardly. During this upward movement of the second-stage plunger 58, the valves 116 and 112 are actuated to terminate the feeding of fibers and initiate a new compression stroke of the first-stage plunger 36.

When the first-stage plunger 36 reaches the upward extent of its stroke, the pin 124 shifts the upper lip of the slide upwardly to initiate a new downward stroke of the first-stage plunger. The plunger 58 engages a newly horizontally compressed charge of fibers and rams the charge into the extruder passage 56. This action causes the previously formed board segments to be advanced along the extruder passage.

The board segments are heated at the melting station 80 such that the natural resinous binder substance of the fibers melts. Subsequent cooling of the fibers at the setting station 82 hardens this resinous substance. Consequently, the fibers of each board segment adhere to each other and to fibers of adjacent board segments. Thus, the board product which is discharged through the end of the extruder passage comprises a unitary board product which can be conveniently sheared-off by the cutting saw 96 into desired sizes.

SUMMARY OF MAJOR ADVANTAGES OF THE INVENTION

It will be apparent from the foregoing description that a minimum number of plunger strokes are required to substantially reorient a mass of randomly oriented sugarcane fibers and compact the fibers into a board segment of given thickness with the fibers extending generally parallel to the board axis.

By orienting the extruder passage and the second-stage plunger vertically, the gravitational weight of the plunger aids in compressing the fibers. Also, the natural weight of the fibers themselves facilitates realignment of the fibers and movement of the fibers through the extruder passage.

The melting and setting stations located along the extruder passage enable the newly formed board segments to be quickly formed into an integral, unified board product capable of subsequent sizing and stacking.

The pre-cooling station 90 resists premature melting and setting of the resinous binder substances associated with the sugarcane rind fibers.

The fabricated board product, with its fibers oriented generally parallel to the longitudinal board axis, closely approximate the fiber pattern of natural lumber. Consequently, sugarcane rind lumber could be employed in the same manner as wooden lumber since the appearance and structural strength characteristics thereof are not significantly different. If desired, the boards made by the present invention could be utilized to make plywood by assembling together a multiple arrangement of the boards with their fibers disposed in alternating directions to provide multi-directional strength.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A board forming apparatus in which a mass of sugarcane rind fibers is formed into a unitary board structure, said apparatus comprising:

means defining a collection zone for accumulating a mass of sugarcane rind fibers;

a horizontally reciprocal first-stage plunger having a sweep face disposed behind said collection zone;

a fiber compression zone located adjacent said collection zone;

power means for horizontally shifting said first-stage plunger toward said compression zone to horizontally compact said mass of sugarcane rind fibers in a manner tending to reorient said fibers so that vertical planes containing said fibers are disposed substantially parallel to said sweep face;

a vertical extruder passage being disposed below said compression zone;

a vertically reciprocal second-stage plunger arranged above said compression zone;

power means for vertically shifting said second-stage plunger to push said horizontally compacted sugarcane rind fiber mass downwardly into said extruder passage and vertically compact said sugarcane rind fibers in a manner tending to reorient said sugarcane rind fibers in substantially horizontal planes to define a board segment comprised of sugarcane rind fibers having their axes disposed substantially parallel to the longitudinal axis of said board segment;

said extruder passage being arranged to receive a column of abutting board segments;

a melting station comprising heating means for heating said board segments and melting natural resinous binder substances thereof; and a setting station being disposed below said melting station and including cooling means for cooling said board segments and rehardening said natural resinous binder substances to bind together said board segments into a unitary board structure.

2. Apparatus according to claim 1 wherein said collection zone includes a table for receiving a mass of sugarcane rind fibers; said first-stage plunger being arranged for sliding movement across said table.

3. Apparatus according to claim 2 wherein said compression zone includes a stationary wall a lower portion of which defines a wall of said extruder passage.

4. Apparatus according to claim 2 including a power driven conveyor for discharging sugarcane rind fibers downwardly onto said table.

5. Apparatus according to claim 1 wherein said melting zone includes heating elements for heating opposite sides of said extruder passage.

6. Apparatus according to claim 5 wherein said bonding means includes means for cooling opposite sides of said extruder passage.

7. Apparatus according to claim 6 including a precooling zone located above said melting zone for resisting premature melting of the natural resinous binder substances of said board segments.

8. Apparatus according to claim 4 including means for automatically actuating said first and second-stage plungers and said conveyor in sequence.

* * * * *